Oct. 25, 1932.  F. M. SLOUGH  1,885,048
ELECTRICAL SYSTEM
Filed Oct. 7, 1924
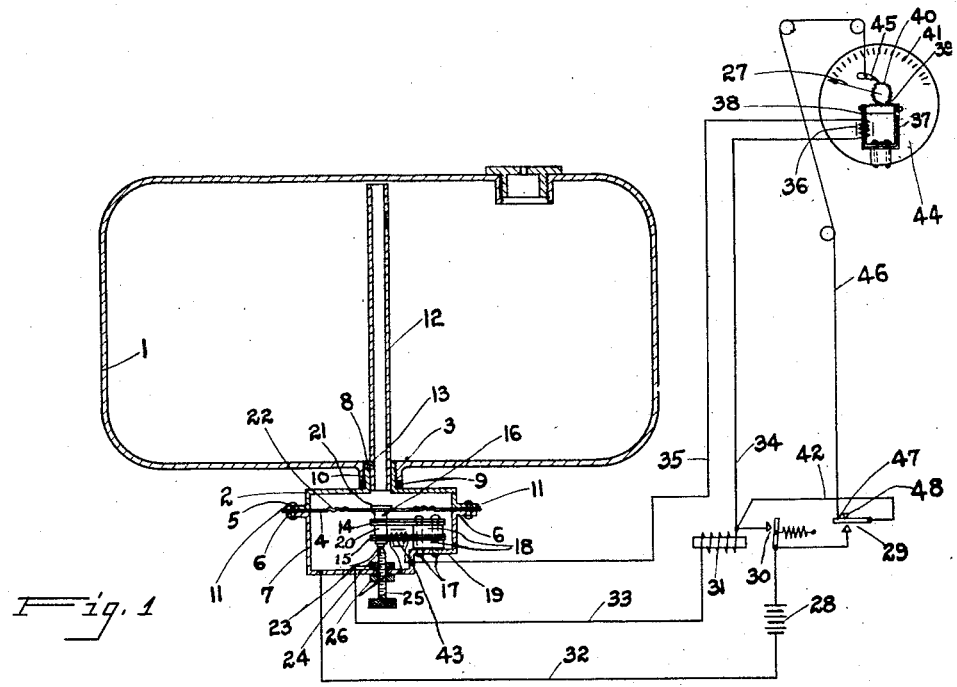
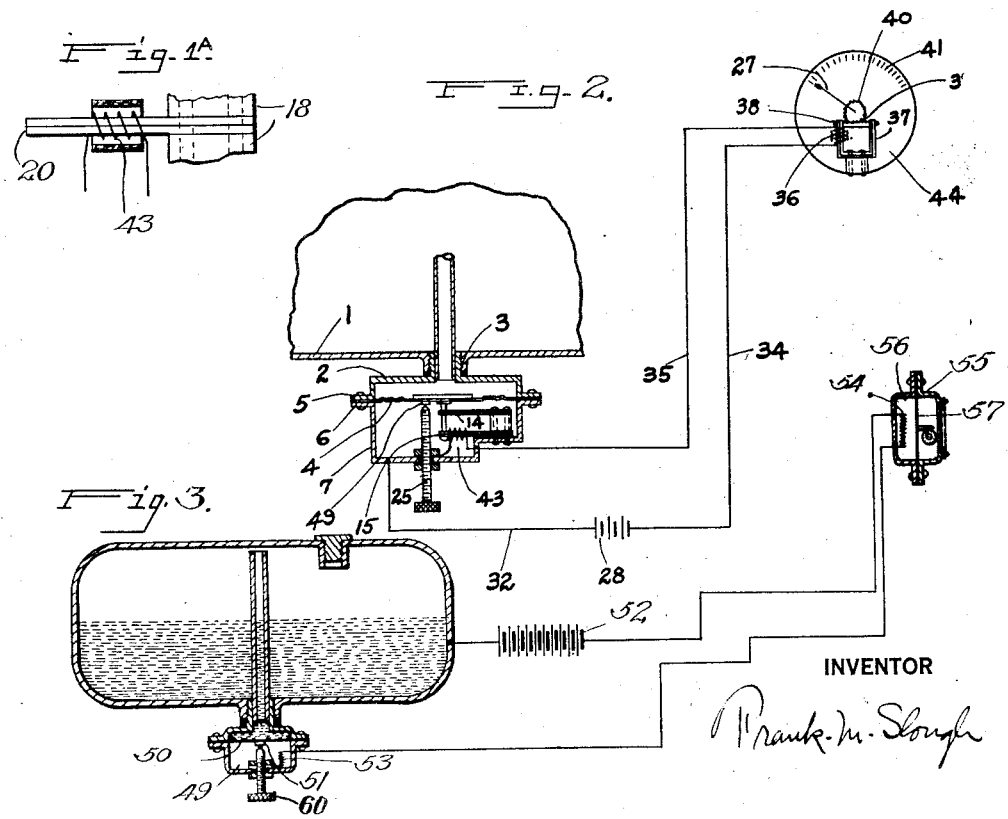
INVENTOR
Frank M. Slough Patented Oct. 25, 1932

1,885,048

UNITED STATES PATENT OFFICE

FRANK M. SLOUGH, OF ELYRIA, OHIO, ASSIGNOR TO THE ANDERSON COMPANY

ELECTRICAL SYSTEM

Application filed October 7, 1924. Serial No. 742,273.

My invention relates to electrical systems, and relates especially to such systems as may be advantageously employed to effect the movement of an element such as the pointer of an indicator, or other mechanical means, commensurably to the effect of a physical condition, existing at a point disposed remotely to said indicator or other mechanical means.

An object of my invention therefore, is to effect accurate control of a movable element responsive to the physical effects of a condition existing at a relatively distant point.

Another object of my invention is to effect distant indication of the quantitative value of a physical condition, such as a fluid pressure, which may be responsive to a liquid level, or any other physical condition capable of exerting physically sensible effects at a controlling station.

Another object is to effect the variation of the position of a movable element in a range of movements in accordance with variations of a variable quantity or condition existing at a remote point or station.

Another object of my invention is to effect the aforesaid objects by the electrical effects of an electrical current flowing between the controlling and controlled stations.

Another object of my invention is to effect the aforesaid objects, in an electrical system, wherein the controlled distant movable element is moved, independently of variations in voltage of the source of electrical current, commensurably with the quantitative value of the effect resulting from the said physical condition.

Another object of my invention is to employ in a system, wherein the aforesaid objects may be achieved, electro-thermal means at the controlled station for effecting graduated movement of the movable element to a controlled position.

Another object of my invention is to effect accurate graduated control of a distant movable mechanical element under the joint thermal effects of electrical heating elements at the controlling and controlled stations.

Another object of my invention is to provide improved means for efficiently indicating force effects exerted remotely of the point of indication.

Another object of my invention is to provide an improved electrical system adapted for the remote indication of the height of liquid levels, the force of fluid presures, or the movement and/or weight of a distant movable element.

Another object of my invention is to provide an improved method of remote control.

Another object of my invention is to provide an improved remote control system.

Another object of my invention is to provide an improved method and system for remotely indicating the quantitative value of a physical effect.

Other objects of my invention, and the invention itself, will be better understood by reference to the following description of an embodiment thereof, and in which description reference will be had to the accompanying drawings forming a part of this specification,—and in which drawings—

Fig. 1 shows a view of an embodiment of my invention, partly in section, and partly in elevation, certain portions whose character is well known being largely shown diagrammatically.

Fig. 1a illustrates one manner of applying an electrical heating element to a bi-metallic thermally warpable strip employed in the embodiment of Fig. 1, the heating element being provided with a heat insulating covering adapted to retard loss of heat by the element and strip.

Fig. 2 shows a similar view of a second embodiment of my invention.

Fig. 3 is a similar view of a third embodiment.

Referring now to the drawings, in which the corresponding parts shown in the different figures are indicated by like reference characters, at 1, I show a liquid container, herein intended to be the gasoline tank of an automobile, and at 3 I show a threaded opening in the bottom of the tank, into which is screw-threaded a flanged controller support 2. The support 2 is herein shown as comprising an externally threaded neck 8, and an annular peripheral clamping flange 5. A gasket 9 is interposed between the horizontal portion of the support and the abutting edge of the downwardly projecting tubular extension 10 of the tank, to prevent leakage of gasoline or other liquid contained in the tank 1.

A yieldable diaphragm 4 is clamped tightly against the under surface of the flange 5, by clamping it between the flange 5 and a flange 6 of a cup-member 7, said cup member being at the same time, supported by rivets passing through the superposed flanges and interposed diaphragm border portion. I preferably also make the diaphragm of such a diameter that it projects slightly whereby the projecting portion thereof can be readily soldered to the edge of the upper flange as shown at 11.

The neck 8 of the support 2 carries, preferably as shown, a vertical tube 12 preferably open at its upper end adjacent the top wall of the tank 1, the tube having a very small opening 13 at its lower end to permit the ingress and egress, restrictedly, of the gasoline or other liquid contained in the tank to and from the tube. The opening 13 is to be made of such size that changes of level due to momentary tipping of the tank as may occur when the vehicle carrying it is in movement, will not undesirably vary the level of liquid in the tube, the restricted communicating orifice 13 may be made so small that a substantial interval will elapse before such tipping will greatly affect the level of the tube contained liquid, and I may sometimes make it so small that a ten percent difference in level outside and inside the tube will only be equalized in a period of tipping causing it, of about 1 or two minutes.

A ledge portion 19 of the cup bottom wall, supports a pair of preferably bi-metallic strips 14 and 15 each secured by an end to the cup wall by the screws or bolts 17 and preferably separated from each other and from the cup by the blocks 18, which are adapted to rigidly clamp the strips to the cup wall by the blocks 19. The strips 14 and 15 may be formed by riveting, soldering, or welding superposed strips of two different materials face-to-face together along their entire length, this material is a common purchasable commodity, being known as bi-metallic sheet material or as thermo-metal, being usually formed of two joined strips of brass and steel, or of alloys of these materials; it is possible to secure this material in strips of given dimensions and having definite predetermined qualities—within limits—when subjected to the influence of heat which causes it to warp, a relatively free end of the composite strip being then moved in the direction of relative placement of the less expansible metal.

Of the strips 14 and 15, the strip 14 is provided for the purpose of compensating the action of the controller mechanism, disposed within the cup member 7, for changes of atmospheric temperature to which it may be exposed and which otherwise might affect the electro-thermally-responsive strip 15 to cause improper operation thereof. Such thermal compensation for the strip 15 may be accomplished in any of the usual ways, one of which is shown.

The pair of strips 14 and 15 are arranged reversely the less expansive metal of one, in the embodiment shown this being the uppermost or compensating strip 14, being placed on the side of the strip remote from the diaphragm 4, which is preferably arranged above and parallel to the strips, and the lower strip having its component of less expansibility responsive to heat, oppositely arranged that is, uppermost, on that side nearest the diaphragm.

This arrangement has the advantage that when, as shown, the free ends of the strips are joined, as by the member 20, the so-joined ends are mutually thermally neutralized and therefore non-warping when alike thermally influenced by atmospheric heat changes.

The joined ends referred to are together joined to the diaphragm, preferably near its center by a junction member 16 secured by bolting, soldering or riveting to the diaphragm, in the embodiment shown I solder the upper end of the member 16 to the center of the diaphragm, whereby leakage of liquid through the joint is effectually prevented. A diaphragm stiffening disc 21 is likewise secured to the center of the diaphragm and the diaphragm is preferably crimped as shown at 22 to increase its responsiveness to the weight of the column of gasoline or other liquid disposed above it.

An electrical contact element 23 is carried by the diaphragm, such as on the lower surface of the free end of the strip 15, as shown in Fig. 1, or directly on the diaphragm as in Fig. 2, at 49; and a co-operating contact 24 is carried on the upper end of a contact screw 25, carried by the bottom of the cup 7, but insulated electrically therefrom.

The contact screw is advanced upwardly until its contact 24 makes connection with the contact 23, when the diaphragm is undeflected by weight of gasoline above it. Then the adjustment is perfected, for most purposes by backing the contact 24 off until no contact is made, but so close that contact is made whenever such an amount of gasoline is contained in the tank that a measure of it is desirable. This critical amount of gasoline is preferably that which will fill the space above the diaphragm even with the bottom of the tank proper, and plus that amount of gasoline which the user or others may prefer to be maintained in the tank but not recorded by an indicator 27. Nuts 26 clamp the screw 25 in proper adjusted position.

At 44 I provide for the systems of both Figs. 1 and 2, a form of ambient air temperature compensating electrical current indicator, comprising a bi-metallic operating strip 38 carrying a heating winding 36, and compensated for atmospheric temperatures by a second counter-balancing bi-metallic strip 37.

Movement of the free joined ends of the strips 38 and 37 under the impelling influence of the electrically heated strip 38 will through a suitable rack 39, and pinion 40, move a gauge pointer 27 over a graduated scale 41.

The strip 14 has wound thereon an electric heating winding 43, one terminal of which is grounded on the cup 7 and the other terminal of which is connected to a current supply conductor 35.

At 44 is an indicating device or gauge comprising a gauge pointer 37 secured to a rotatable rack pinion 40 which is meshed with the rack 39 supported upon the upper free ends of a pair of bi-metallic strips 38 and 37 rigidly supported at their lower ends. One of the strips such as the strip 38 has thereon an electric heating winding 36 connected to the external conductors 35 and 34. The strips 37 and 38 tend to bend thermally toward each other so as to compensate for changes of atmospheric or local temperature and to prevent movement of the gauge pointer operating rack 39 upon a change of local temperature in a manner described more fully in connection with the strips 14 and 15.

Referring now particularly to the embodiment system of Fig. 1, at 28 I show a source of electrical current, which may be an electric storage battery, carried by the automobile or other vehicle having the gasoline tank 1; and in the circuit of such battery are the contacts 23—24, a connecting circuit conductor 42, a conductor 33, grounded on the insulated screw 25, and a conductor 32 grounded on the casing 7, and a switch 29. There is also included within such circuit a winding of a relay 31 which is energized whenever current flows over the conductor 33, consequent to the closing of the switch 29 and closure of the contacts 23—24.

Momentary closure of the contacts 29 will cause current from the source 28 to flow through conductor 42, the winding of the relay 31 conductor 33, contacts 23—24, casing 7 and conductor 32, assuming that the contacts are in closed condition. The relay will attract its armature closing contacts at 30 which are thus substituted in the circuit described for the contacts 29. Current will now flow from the source 28 through the contacts at 30 (or 29), circuit conductor 34, heating winding 36 of the device 44, circuit conductor 35 and heating winding 43 of the mechanism contained in the casing 7, the circuit being completed through the casing 7 and circuit conductor 32. The heating by the winding 43 will effect bending of the strip 15 downwardly, opening the contacts, 23, 24, breaking the circuit of the relay 31 and of the heating coils 43 and 36, and the relay circuit being opened will remain open due to the breaking of its contacts at 30.

Energization of the relay will close its contacts 30 resulting in the locking of these contacts in closed position by continuous energization of the relay winding by battery current flowing through the contacts 30 and the circuit just traced, the contacts 30 being substituted therein for the switch contacts 29, when these contacts are opened after a closure thereof. The operator therefore if it is desired, may only close the switch 29 momentarily, and the contacts 30 being thereupon closed will relieve him from continuing the switch closure.

Whenever the relay 31 is operated to close its contacts, or the switch 29 is closed, current from the battery will flow thru such relay or switch contacts, or both,—to heat coils or other electro-thermal elements, such as the winding 36 on the thermo-expansive strip 38, of the indicating gauge device 44, and the winding 43 on the similar thermo-expansive strip 15. This will be accomplished by current flowing through the circuit above described. These strips are so disposed that, absorbing heat from their windings they will warp, the strip 38 warping its free or, as shown, its top end towards the right, and the strip 15 warping its left end, as shown, upwardly.

The heating elements 36 and 43 may be covered as by an asbestos or other heat insulating shield, as indicated by straight lines on either side thereof in the drawings, to retard loss of accumulated heat from the heated strip; or the bimetallic strips may be given such a degree of thermal inertia as may be found desirable by properly proportioning the masses of heated material of the strips and the heating elements, or both.

This warping of the strips heated will upon a sufficient degree of heating move their ends in directions noted, until the strip 15 shall by its warping, have exerted enough of a lifting effort on the diaphragm to overcome the weight of whatever amount of gasoline there is exerting weight on the diaphragm to keep closed the contacts 23—24, and whenever this weight of gasoline is overcome, the contacts 23—24 will be re-opened.

The re-opening of the contacts 23—24 by the warping of the strip 15 will unlock the circuit of the relay winding 31 to release the relay, opening its locking contacts at 30, whereupon the battery current will be disconnected from all relay and heating windings. The warping of the strip 15 being accompanied by a corresponding warping of the strip 38 of the gauge, the gauge pointer 27, is caused thereby to move over a scale 41, by the rack and pinion connection 39—40 between the pointer and the end of the warped strip 38.

I have shown a ratchet pawl 45 resting on the teeth of the pinion 40 to prevent the return of the pinion carried pointer 27 from its advanced position when the breaking of the contacts 23—24 causes the disconnection of the battery from the relay and heating coils as before described. Thus the operator pressing the button 48 of the switch 29, momentarily may accomplish permanent registration by the pointer 27 of the amount of gasoline in the tank. The pointer may be reset by lifting the pawl momentarily in any suitable way. I have shown a way of doing this by means of a slight pressure exerted on the button 48 of the switch 29, a connection link 46 leading from the button to the pawl lifting the pawl and re-setting the pointer.

In Fig. 2 I have shown an embodiment of my invention wherein the relay and push button switch are omitted, the system being constantly operative to give at all times gauge indications corresponding, so as to be indicative, of gasoline weight in the tank. In this figure, the battery 28, the heating windings 36 and 43, and the contacts at 49 (respectively on the diaphragm 4 and on the end of the insulated screw 25) are connected in serial circuit by circuit conductors 32, 34, and 35. The contacts 49 are closed whenever the weight effects of gasoline on the diaphragm exceed the diaphragm-lifting effort of the strip 15 applied to the diaphragm and which is heated to a degree depending upon the length of periods and number of periods of closure of the contacts 49.

The gauge pointer movement will measurably show the effective weight of gasoline or other liquid on the diaphragm 4, since the given gasoline weight effect on the diaphragm is required to be overcome by a given amount of warping of the strip, caused by a corresponding heating of the strip, and since the relations of heating and warping of the strip 15 are commensurable to that of the strip 38. In each case, preferably the warped strips are counterbalanced for ambient temperatures by opposing like strips such as the strip 14 which counterbalances the strip 15, and the strip 37 which counterbalances the strip 38. While I have described the strips and heating windings etc. for the diaphragm device, and for the gauge device as being preferably alike, this although desirable is not essential, as the gauge using sizes of strips and windings or equivalent heating elements different from those on the diaphragm device, may be calibrated to indicate weight effects of gasoline on the diaphragm.

Since the effective weight of gasoline on the diaphragm is necessarily commensurable to the total amount of gasoline in the tank, and in many forms of tanks substantially proportional thereto. The effect of such effective weight in producing a certain deflection of the pointer 27 peculiar to such weight effect, will be indicative of the amount of gasoline in the tank.

A lifting is effective upon the diaphragm by the upward deflection of the warped strip 15, due to heating thereof, causing the contacts 23—24 to be opened until by the resultant discontinuance of current flow through the coil 43, the strip 15 will cool and start to regain its unwarped shape, until the contacts are thereby again closed and the cycle repeated. In this way, particularly in the system of Fig. 2, the contacts are constantly opening and closing to maintain in the diaphragm-lifting strip 15, an amount of heat sufficient to cause the strip to just balance in its effort upon the diaphragm, the weight effect of gasoline above it, which is to be indicated by the gauge. The strip 38 of the gauge is at all times heated commensurably to the heating of the strip 15, and such heating is indicated by the position of the pointer of the gauge on the scale thereof. No pawl or equivalent pointer holding means therefore need be employed with the device of Fig. 2, but for some purposes one may well be employed in the system of Fig. 1.

In the embodiment of Fig. 3, the pressure for restoring the diaphragm to electrical contact breaking position against the weight of the gasoline above it is caused by the heating of an expansible fluid such as air, or vapor created by the heating of a liquid such as alcohol or water, and which fluid is contained in the fluid-tight compartment 49. Such a fluid pressure will so lift the diaphragm 50 as to break the contacts 51 of the electrical circuit which includes the source of current 52 and heating coil 53 in the compartment 49. A second heating coil 54 for the gauge 55 may be provided in a fluid-tight compartment 56 thereof, one wall of which compartment is the indicator operating diaphragm 57, moved by expanded fluid in the compartment 56, corresponding, preferably, to that in the compartment 49.

The electrical circuit of Fig. 3 is operated in the same manner as that of Fig. 2, the expansible gas in the chamber 49 when heated by the coil 53, effecting the diaphragm 50 in opposition to the weight of gasoline above the diaphragm just as does the strip 15 of Fig. 2 when heated by the coil 43, and controlling contacts (respectively on the diaphragm 50 and on the adjustable insulated screw 60) 51 in the circuit of the said heating element 53, the source of current 52 and heating element 54 at the indicator. The heating element 54 effects heating of the fluid in the indicator compartment 56 and by expansion containing the fluid the diaphragm 57 is moved to rotate the spindle of an indicating hand, not shown, but in the same manner that the hand 27 of Fig. 2 is moved by warping of the strip 38 when heated by the heating element 36.

Means for compensating the controller at the tank and the indicator, for changes in atmospheric temperatures, may be effected in any well known manner according to the teachings of Figs. 1 and 2, wherein thermally responsive elements, corresponding to the electrically heated elements, are disposed in operative opposition to the electrically heated elements.

It will be understood of course, that the systems of Figs. 1, 2 and 3 may be operated without any thermal compensation for changes of atmospheric temperature, where these changes do not undesirably effect the accuracy of the resultant indications.

In each of the embodiments of my invention herein above described the controlled and controlling mechanisms are heat responsive so that it is self-evident that the voltage of the electrical source does not have any effect to change the degree of response of the controlling thermostat, such as shown at 15, which is necessary to break the contacts such as 23—24, Fig. 1, since if the voltage is higher, for instance, the electrical current value will be increased, but this will result in quicker heating at both stations and a correspondingly quicker breaking of the contacts. This effects an automatic compensation for voltage changes and is of value where voltage changes are likely to be encountered.

Having described my invention in certain embodiments I am aware that numerous and extensive departures may be made from the systems shown herein and described but without departing from the spirit of my invention.

I claim:—

1. In a system for indicating the amount of liquid in a tank at a level different from the liquid level, a deflectable member variably responsive to weight of liquid communicated thereto from the tank, according to the amount of liquid therein, an electrical heating element, a source of electrical current, means responsive to the deflection of said member to close an electrical circuit comprising said source of current and said element, means responsive to absorption of heat from said element adapted to exert a deflecting effort on said deflectable member opposing the weight of liquid thereon according to its accrued temperature to restore said member and open the electrical circuit when the said opposing forces exerted on the member by the weight of liquid and the heat absorbing means are approximately balanced, and means to indicate the accrued temperature of said means.

2. In an automotive tank fuel gauge, a thermo-responsive indicator, an electrical heating element therefor, said indicator indicating the amount of heat set up in said element, a source of electrical current, a set of electrical contacts, a second electrical heating element, circuit conductors interconnecting said second element with said first element, said contacts and said source to communicate current from the source to both said elements whenever the contacts of said set are closed, a deflectable member exposed to weight of liquid of the tank, and responsive thereto to close said contacts, and means responsive to temperature accruing from heat absorbed from said second element opposing the effect of the weight of liquid on said member to reopen said contacts, both said elements being heated when and only when said contacts are closed.

3. In mechanism for indicating liquid levels, a member movable responsive to weight of liquid whose level is to be indicated, heat operable means opposing the effect of such weight of liquid on the member, an indicator for showing the force of said means on the member, a source of heat, and means under the control of said member to cause heating of the heat operable means from the source whenever the effect of the liquid weight on the member is in excess of the force of the heat operable means thereon.

4. In combination with the liquid containing fuel tank of a vehicle, a diaphragm one side of which is exposed to weight of liquid of the tank according to the amount of liquid in the tank, heat responsive means adapted when heated to effect pressure against the other side of the diaphragm according to the accrued temperature thereof, mechanism responsive to movement of the diaphragm caused by the excess of force imparted thereto by weight of liquid on the one side thereof over the force imparted by pressure effected by the said means on the other side thereof to cause heating of the said means, and thermo-responsive indicating means to indicate accrued temperature of the said means.

5. In a system for indicating the amount of liquid in a tank, a diaphragm having a portion variably movable responsive to the effect of the pressure head of liquid in the tank communicated thereto, an electrical heating element, a source of electrical current, an electrical circuit comprising electrical circuit conductors for communicating current from the source to the element, means responsive to the movement of said diaphragm portion to vary the amount of current flowing in the said circuit, a thermostat, said heating element adapted to heat the thermostat, said thermostat having a portion movable responsive to such heating to oppose the effect of such liquid pressure exerted on said diaphragm according to the temperature of the thermostat, and a separate electro-responsive element in the said circuit operable to effect indication of the temperature of the thermostat.

6. In a system for indicating the amount of liquid in a tank, a diaphragm having a portion variably movable responsive to the varying effects of different amounts of liquid in the tank, an electrical heating element, electrical current source means, an electrical circuit comprising electrical circuit conductors, for communicating current from the source means to the element, means responsive to the movement of said diaphragm portion to vary the amount of current flowing in the said circuit, a thermostat, said heating element adapted to heat the thermostat, said thermostat having a portion movable responsive to such heating to oppose the effect of such liquid pressure exerted on said diaphragm according to the temperature of the thermostat, and a separate electro-responsive element in the said circuit operable to effect indication of the temperature of the thermostat at a point disposed remotely therefrom, comprising a second heating element, and means comprising said conductors for effecting variations of heating effect of said second element co-extensively with the variations in current through the conductors.

7. In a mechanism for indicating a liquid level, a diaphragm having a portion movable responsive to the effect of the pressure head of liquid whose level is to be indicated, thermally responsive means opposing the effect of such pressure head on the diaphragm with the force varying in degree according to variations in said head of liquid, an indicator for showing the temperature of said means, an electrical circuit comprising a source of electrical current, a pair of heating elements, and circuit conductors adapted to communicate current from the said source to the said elements, a first one of said heating elements adapted to communicate heat to the said thermally responsive means, and means actuated by the said diaphragm portion when moved, adapted to effect a variation in the amount of flow of current from the source concurrently through both of said heating elements, whenever the effect of the liquid weight on the diaphragm varies a predetermined relation between it and the force of the thermally responsive means, said thermally responsive means when heated tending to restore such relation, and a movable indicator element adapted to be moved to different indicating positions according to the temperature of said second heating element.

8. In a system for measurably indicating pressure, an element exposed to the pressure to be determined, an electric current controller, said controller movable by pressure of said element, an electrical heating element, a source of electric current and means comprising electrical circuit conductors for communicating current from the source through the controller to the heating element, means variably responsive according to the communicated heating effect of the resistance element adapted to variably oppose the effect of the exposed element upon said controller, and separate means operable under the control of the controller adapted to integratingly indicate the current flowing through the controller.

9. In a mechanism for indicating the force of a pressure, a thermostat, an electrical heating element therefor, means for communicating the force of the pressure of the thermostat, a source of electric current, a second heating element disposed remotely to the first heating element, a set of electrical contacts actuatable to effect simultaneous commensurable variation of electrical current flow from the source through both said heating elements, said force communicating means adapted to actuate the contacts, said thermostat when its temperature is varied adapted to variably oppose the actuating effect of said means upon said contacts and a temperature indicator responsive to the heating effect of said second element to indicate the temperature thereof.

10. A pressure indicating mechanism comprising a diaphragm, an electrically heated thermostat, an electrically heated temperature indicator disposed remotely from the thermostat, a set of electrical contacts, a source of electrical current, and circuit conductors adapted under the control of said contacts, to effect simultaneous communication of current from the source through the thermostat and the indicator to heat them, said diaphragm responsive to changes in value of said pressure to vary the operation of said contacts, said thermostat responsive to variations of heating effect, incidental to such variation of the contacts, to oppose the same.

11. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer.

12. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, said controller comprising an electrical relay operable upon a predetermined departure from a balance of opposed pressures of said pressure means and said thermostat, said relay controlling the electrical circuit through said thermostat heating element.

13. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, said controller comprising an electrical relay operable upon a predetermined departure from a balance of opposed pressures of said pressure means and said thermostat, said relay controlling the electrical circuit through both said heating elements.

14. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, said pressure means comprising a diaphragm element having a movable portion disposed between the liquid in the container and the controller to prevent exposure of said controller to the liquid.

15. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, said controller comprising an electrical relay operable upon a predetermined departure from a balance of opposed pressures of said pressure means and said thermostat, said relay controlling the electrical circuit through said thermostat heating element, and manually operable means adapted to initiate heating of the thermostat, said manually operable means comprising an electrical switch interposed in the said circuit conductors.

16. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element, for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, and an electrical switch interposed in the circuit of the said conductors adapted to effect communication of current from the source to said thermostat heating element.

17. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, said pressure communicating means comprising a diaphragm deriving actuating pressure from the head of liquid in the tank.

18. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, and means to adjustably vary the effect of said thermostat and pressure means on said controller.

19. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, and means to prevent rapid changes of liquid level from affecting the pressure communicated by said pressure means to the controller.

20. In combination with a container for liquid, a source of electrical current, an electrical current controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, a thermometer, a second heating element for the thermometer, means comprising circuit conductors so joining the controller and said elements to the source as to simultaneously effect control of current from the source through each of said elements to separately heat the thermostat and the thermometer, said heating elements, said source of current and said controller being joined with said circuit conductors in serial circuit.

21. The method of determining, at a distance, the amount of liquid in a container, comprising opposing the pressure effect of the head of liquid by a counter force resulting from heat, setting up the heat as a result of the pressure effect and continuing until the force of the pressure effect is balanced, and simultaneously and commensurably duplicating the heating effort required to effect the balance of forces, at a distance, and measuring the result at commensurable temperature.

22. The method of indicating a liquid level at a remote point, comprising opposing a pressure effort of the liquid head due to the level, by a force thermally affected upon a departure from a predetermined relation between the said effort and the said force until an approximate balance in force and effort results, in maintaining the balanced condition, and measuring the intensity of heat required to do so.

23. The method of indicating a liquid level at a remote point, comprising opposing a pressure effort of the liquid head due to the level, by a thermally effected force variably effective upon departures from a predetermined relation between the said effort and the said force to achieve an approximate balance in force and effort, in maintaining the balanced condition, by intermittently increasing the thermal effect required to do so, and simultaneously supplying separate correspondingly, varying, heating impulses to a remotely disposed heat-responsive indicator, commensurable in heating value and duration to the said thermal effects.

24. In an electrical system for remotely indicating the value of a variable pressure, a controlling and a controlled electrical heating element, an electrical switch, a source of current, and electrical circuit conductors interconnecting said source, said heating element and said switch, said switch when operated, adapted to effect a flow of current from said source over said conductors through said elements, and means variably responsive to the pressure to be indicated according to the value of pressure, adapted to operate said switch, and thermally operable means, disposed so as to respond to heating by said controlling element, commensurably with the value of said pressure, adapted to restore said switch, and a thermally responsive indicator adapted to indicate the accrued temperature of said controlled element.

25. In an electrical system for remotely indicating pressures, a pressure responsive electrical switch, pressure means for operating the switch, a heat operated restoring means for said switch, a heat operated indicator adapted to indicate a temperature communicated thereto disposed remotely to said switch, a source of current, separate electrical heating elements for separately heating said indicator and switch restoring means, and electrical circuit conductors interconnecting said switch and said source of current with said elements, whereby said switch under the joint control of said pressure means and said restoring means, is operated periodically to periodically electrically energize said elements.

26. The method of indicating a pressure, remotely from the point of application of the pressure, comprising simultaneous heating at the point of application of the pressure, and at a remote separated point of indication thereof, of simultaneously translating effects of heat at the two points into physical force, simultaneously interrupting the heating at the two points into like successive heating periods, recurrently discontinuing the heating at both points whenever the resultant force derived from heat at the point of pressure application bears a predetermined relation to the force exerted by the pressure applied thereat, and meanwhile indicating the force continuously exerted at the point of indication as a result of the effect of successive heating in periods thereat.

27. The method of remotely indicating any variable pressure capable of moving a controller, remotely from the controller, comprising simultaneous heating at the controller and at a heat responsive indicator, simultaneously accumulating heat at the controller and indicator under conditions of heat loss by radiation, convection and conduction, of translating the effects of heat at the controller into physical force commensurable with the amount of accumulated heat, of continuing the building up of the resultant force by heating at the controller, until it bears a predetermined relation to the degree of effect of the variable effective on the controller, discontinuing the heating at the controller and indicator whenever the heat generated physical force at the controller exceeds said predetermined relation, and effecting resumption of heating at the controller and indicator whenever, due to loss of heat at the point of application, the force derived from heat thereat, is slightly decreased below the said relation.

28. The method of remotely indicating a pressure effect, comprising gradually overbalancing the said pressure effect, by a gradually built-up heat generated pressure opposed thereto, supplying heat to increase the heat generated pressure to cause it to exceed a predetermined relation to the first pressure, and discontinuing the communication of pressure generating heat whenever the heat generated pressure exceeds the first pressure, and subsequently resuming the heating to supply the heat necessary to restore a slight preponderance of heat generated pressure over the first pressure, and continuing the aforesaid operations cyclically, and simultaneously periodically heating a remotely disposed heat storing temperature indicator, for like heating periods, and noting the temperature at the indicator.

29. The method of continuously indicating pressure conditions at a distance from the source of pressure, comprising the simultaneous heating, of separate heat storing and radiating heating elements, one at the source of pressure, the other at the point of indication, and periodically simultaneously discontinuing the heating of the elements when the first element is heated to a temperature approximately commensurable with the pressure effected at the time by the source, and simultaneously resuming heating of the two elements upon a predetermined cooling of the first element.

30. The method of remotely indicating the value of a variable pressure, comprising varying the heating of a pair of separated heat responsive elements at all times commensurably with the variable value of the pressure, by periodically interrupting the heating whenever the responsiveness of one of the elements exceeds the responsiveness of a variable pressure responsive element, effecting continuously gradually reduced responsiveness during cooling periods by stored heat, and by varying the length of the heating periods relative to the length of the cooling periods, according to variations of the pressure, and simultaneously effecting heating of the remote element in periods coextensive with alternate of said periods, and indicating, remotely, the average temperature of the remote element.

31. The method of indicating a liquid level at a point remote thereto, comprising establishing a numerical relation between the weight of a column of liquid and the temperature of a thermally responsive element, and simultaneously quantitatively increasing the temperature of the thermally responsive element and a remotely disposed thermally responsive indicator upon any predetermined departure from said relation due to cooling of the element, and discontinuing the heating of both the element and indicator upon a predetermined excess in temperature of said element over said numerical relation.

32. The method of determining at a distance therefrom, the force set up by weight of liquid in a container, comprising the continuous generation of a second force by application of heat until a predetermined relation is established between the second force and the force set up by the weight of liquid, effecting heating of a remotely disposed thermally responsive indicator simultaneously with said force generating heating, discontinuing all heating whenever the generated force substantially exceeds the said relation with the force due to the weight of the liquid, renewing the simultaneous heating whenever due to loss of force generating heat, the resulting force is decreased substantially below the said relation with the force due to the weight of the liquid.

33. In an electrical system for remotely indicately the value of a variable pressure, a controlling and a controlled electrical heating element, an electrical current flow controller, a source of current, and electrical circuit conductors interconnecting said source, said heating element and said controller, said controller when operated adapted to effect a flow of current from said source over said conductors through said elements to concurrently heat them, and means variably responsive to the pressure to be indicated, adapted to operate said controller, and to bias it against restoration an amount depending upon the value of the pressure to be indicated and thermally operable means, disposed so as to respond to heating, adapted to gradually restore said controller, and a thermally responsive indicator adapted to indicate the accrued temperature of said controlled element, and separate temperature compensating means for each of said thermally operable means and said indicator, adapted to compensate the same for variations in atmospheric heating.

34. In an electrical system, an electrical controller, operating means for operating the controller, a heat operated restoring means for the controller, a heat operated indicator adapted to indicate a temperature communicated thereto disposed remotely to said controller, a source of current, separate electrical heating elements for separately heating said indicator and controller restoring means, and electrical circuit conductors interconnecting said controller and said source of current with said elements, whereby said controller under the joint control of said operating means and said restoring means, is operated periodically to periodically electrically energize said elements, and separate means associated with each of said elements, adapted to separately compensate said elements for atmospheric heating thereof.

35. The method of indicating a pressure remotely from its source, comprising the periodic overbalancing of the pressure at the source, by a heat generated pressure, periodically supplying heat to increase the heat generated pressure at rates above the rates of cooling to cause it to exceed a predetermined relation to the first pressure, and discontinuing the communication of pressure generating heat whenever said relation of pressures is substantially exceeded, and simultaneously periodically heating a remotely disposed heat storing temperature indicator, subject to cooling at a rate lower than its heating rate, for like periods, and noting the temperature at the indicator, meanwhile continuously opposing the ambient heating effect upon the temperature indicator to compensate the indicator for atmospheric temperature conditions.

36. In an electrical system, the combination with electrical current source means, a pair of co-relatively remotely disposed electrical heating elements, a set of relatively movable controlling contacts adapted for engagement, circuit conductors interconnecting said source means, elements, and contacts, contact operating means variably operable responsive to the temperature effect of a reactive one of said elements to control the relative movement of said contacts to commutate the flow of electrical current from said source over said conductors to said reactive heating element, said contact operating means also concurrently operable to control the flow of current through the other of said heating elements and means operative by force effects of a varying physical condition to vary the current flow to said other heating element, all of the energizing current for said other heating element supplied under the complete control of said contacts, and movable means responsive to changing temperatures of the said other heating element, to progressively take different operative positions according to said changed temperatures.

37. A force indicating mechanism comprising a controlling element acted upon by the force whose strength is to be indicated, an electro-responsive element, an electro-responsive indicator disposed remotely to said element, a current flow controller directly actuatable by said controlling element, said electro-responsive means adapted to oppose the action of said controlling element on said controller, a source of electrical current, and circuit conductors adapted under the control of said controller to conduct simultaneous commensurable flows of current from the source to both said electro-responsive element and said indicator, to energize them, said controller breaking the flow into intermittent variable periods whose aggregate length in a given longer period is commensurable with the force acting upon the controlling element, and inversely commensurable with the strength of said current flows.

38. In combination with a container for liquid, a source of electrical current, an electrical circuit controller, movable means associated with the container adapted to respond to changes of level in the container to operate the controller commensurably with the position of the level, an electro-responsive means adapted when variably energized to variably oppose the effect of the movable means on the controller, an electro-responsive indicator adapted for disposition remotely to the container, means comprising circuit conductors so joining the controller, said electro-responsive means, and said indicator to the source as to simultaneously effect control of current from the source by the controller through both said electro-responsive means and said indicator to separately and co-incidentally energize them under the control of said controller, for such a period until the effect of the movable means upon the controller is overcome by the electro-responsive means, said electro-responsive means and indicator adapted to continuously and gradually effect decay of energization, whereby successive re-energizations are intermittently effected under the control of said controller.

39. In combination with a container for liquid, a source of electrical current, an electrical circuit controller, pressure means associated with the container adapted to respond to changes of level in the container to operate the controller commensurably with the existing level, a thermostat adapted under varying degrees of heating to variably oppose the effect of the pressure means on the controller, a heating element for electrically heating the thermostat, an ambient air temperature compensating thermo-current indicator, means comprising circuit conductors so joining the controller, said element, and said indicator to the source as to simultaneously effect control of current from the source through each said element and indicator to separately energize them, to overcome the effect of the pressure means upon the controller, and to successively re-energize them upon such loss of heat by said thermostat as to reduce its effect upon the controller below a predetermined relation to the effect of said pressure means thereon.

40. In combination with a container for liquid, a source of electrical current, an electrical circuit controller, pressure means associated with the container adapted to respond to changes of level in the container to operate the controller with a pressure commensurable with the level, a thermostat adapted under varying degrees of heating to variably oppose the effect of the pressure means on the controller, a heating element for electrically heating the thermostat, an ambient air temperature compensating thermo-current indicator, means comprising circuit conductors so joining the controller, said element and said indicator to the source as to effect flow of current from the source through each said element and said indicator, under the common control of said controller, to separately energize the thermostat and indicator, and means adapted to compensate said thermostat in its effect on the controller, for changes in atmospheric temperatures.

41. In an indicating system, a controller, a movable means for operating the controller, a heat operable means for opposing the effect of the movable means upon said controller, a heat operable indicator disposed remotely to said controller, electrical current source means, separate electrical heating elements for separately heating said indicator and the heat operable means, and electrical circuit conductors interconnecting said controller, and said elements, and said current source means, said controller, under the joint control of said movable means and said heat operable means, adapted for variable operation to variably effect flows of current from the source means to energize said elements.

42. In an indicating system, a controller, a movable means for operating the controller, a heat operable means for opposing the effect of the movable means upon said controller, a heat operable indicator disposed remotely to said controller, electrical current source means, separate electrical heating elements for separately heating said indicator and the heat operable means, and electrical circuit conductors interconnecting said controller, and said elements, and said current source means, said controller, under the joint control of said movable means and said heat operable means, adapted for variable operation to variably effect flows of current from the source means to energize said elements, and means associated with said indicator heating element adapted to compensate said indicator heating element for atmospheric heating thereof.

43. In an indicating system, a controller, movable means for operating the controller, a heat operable means for disabling said controller, a heat operable indicator disposed remotely to said controller, electrical current source means, separate electrical heating elements for separately heating said indicator heat operable means and the controller disabling means, and electrical circuit conductors interconnecting said controller, and said elements, and said current source means, said controller, under the joint control of said movable means and said disabling means, adapted for variable operation to variably effect flows of current from the source means to energize said elements, and means associated with said indicator heat operable means, adapted to compensate said indicator heat operable means for atmospheric heating thereof.

44. In an indicating system, a controller, a movable means for operating the controller, a heat operable means for opposing the effect of the movable means upon said controller, a heat operable indicator disposed remotely to the controller, electrical current source means, separate electrical heating elements for separately heating said indicator and the heat operable means, and electrical circuit conductors interconnecting said controller, and said elements, and said current source means, said controller, under the joint control of said movable means and said heat operable means, adapted for variable operation to variably effect flows of current from the source means to energize said elements, and means for each said heat operable means and said indicator adapted to respond to changes in atmospheric temperature to compensate them for temperature effects.

45. In combination with a container for liquid, a source of electrical current, a set of electrical contacts, movable means associated with the container adapted to respond to changes of level in the container to operate the contacts, an accumulately operable electro-responsive means adapted, when energized by substantial current flows therethrough, to exercise an effect on the contacts in opposition to the effect of the movable means thereon, an accumulatively operable electro-responsive indicator adapted for disposition remotely to the container, said electro-responsive means and said indicator adapted for loss of operative effects upon cessation of substantial flows of current therethrough, means comprising circuit conductors so joining the contacts, said electro-responsive means, and said indicator to the source as to simultaneously effect control of current from the source by the contacts through both said electro-responsive means and said indicator to separately and co-incidentally energize them under the control of said contacts, said contacts controlling the flows of current through said electro-responsive means and said indicator as to effect indications by the indicator of the work being done by the electro-responsive means substantially independently of the voltage of current supplied by said source, said indicator comprising a movable element, said indicator receiving current from said source under the control of said controller to effect movement of said movable element from a datum position to any one of a plurality of progressively advanced positions according to the quantitative value of the current through said indicator.

46. In an indicating system, a movable means, a source of current, a current controller operable under the control of the movable means, an electro-responsive means adapted when energized to accumulatively oppose the effect of the movable means on the controller, an electro-responsive indicator adapted for disposition remotely to the movable means, both said electro-responsive means and indicator adapted for gradual decay of functional effect during periods of substantially lowered current flows therethrough, said controller controlling the flows of current through both said electro-responsive means and said indicator.

47. In a remote control system, electrical current source means, electrical switch mechanism comprising a pair of electrical contacts having a variably displaceable controlling contact element, said element when displaced maintaining closure of said contacts with a contact pressure commensurable to the amount of displacement of said element, a thermostat adapted whenever heated to a degree commensurable to the displacement of said element to re-open said contacts, an electrical heating element for said thermostat, said contacts when closed effecting communication of energizing electrical current from said source means to said heating element to accumulatively increase the temperature of said thermostat until said contacts are reopened to consequently reduce the energization of said heating element, said contacts being closed intermittently by the alternately slightly predominating control upon said contacts of said displaceable element and said thermostat, a remotely disposed electro-responsive mechanism comprising an electrical energizing unit and a movable element, and means including electrical circuit conductors and said contacts to effect communication to said unit of a series of electrical current impulses having time integrated effects commensurable to the time integrated effects of current coincidentally supplied in impulses under the control of said contact set to said heating element, said movable element responsive to said impulses through the said energizing unit, to move from a normal position to any of a plurality of relatively progressively advanced positions according to the integrated force effects of said impulses and commensurably to the degree of displacement of said controlling element.

48. The system substantially as set forth in claim 47, wherein said energizing unit comprises an electrical heater, and said associated movable element is responsive to the temperature effects of said heater according to the temperature thereof.

49. In a remote control system, electrical current source means, a current flow controller having a variably displaceable operative element, said element when initially displaced effecting operation of said controller, an electrically heated thermostat adapted whenever heated to a degree commensurable to the degree of displacement of said element to restore said controller to a datum operative condition, said controller when operated effecting communication of energizing electrical current from said source means to said thermostat to accumulatively increase the temperature of said thermostat until said controller is restored to reduce the temperature of the thermostat, a remotely disposable electro-responsive mechanism comprising an electrical energizing unit and a movable element, said movable element having a normal position and a plurality of relatively progressively advanced positions to any of which it may be moved and maintained throughout flows of current of predetermined effective values communicated to said unit to energize it, and means including electrical circuit conductors and said controller to effect communication of electrical current flows, to said unit, of integrated effective values commensurable to the amounts of current supplied as aforesaid under the control of said controller to said thermostat and coincidentally therewith.

50. In an electrical control system, electrical current source means, electrical circuit conductors, a thermostat, an electrical heating element operatively associated therewith, a set of controlling electrical contacts controlling the flow of current from said source means to said heating element, said contacts operable by said thermostat, and means variably responsive to the quantitative values of a controlling physical condition biasing said contact set against operation by said thermostat, whereby varying values of said condition will require correspondingly varying operative efforts by said thermostat to offset the biasing effect of the condition upon the contacts, said contacts adapted whenever the said biasing effect thereon exceeds the thermostatic effect thereon, to effect communication of the proper amount of electrical current from the source means over said conductors to said elements to heat the thermostat the right amount to substantially just offset the biasing effect of said condition upon the contact set, a remotely disposed electro-responsive mechanism comprising an electrical energizing unit and a movable element movable responsive to and commensurably to the integrated effects of current flows through said unit, said movable element having a normal position and a plurality of relatively progressively advanced positions to any of which it may be moved and maintained upon the substantial continuance of current flows of predetermined integrated values through said unit to energize it, and means including said electrical circuit conductors and said contact set to effect communication of electrical current to said unit co-incidentally with the flows of current to the thermostat heating element, and in amounts commensurable thereto.

51. In an electrical remote control system, electrical current source means, an electro-thermal device, a set of controlling electrical contacts controlling the flow of current from said source means to said device, said contacts operable by movement of said device and means variably responsive to the quantitative values of a controlling physical condition biasing said contact set against operation by said device whereby varying values of said condition will require correspondingly varying operative efforts by said device to offset the biasing effect of the condition upon the contacts, said contacts adapted, whenever the said biasing effect thereon exceeds the effect of the device thereon, to effect communication of the proper amount of electrical current from the source means to said device to accumulatively increase the operative temperature and consequently the operative effect thereof until the effect of said device substantially just offsets the biasing effect of said condition upon the contact set, a remotely disposable electro-thermal mechanism comprising an element movable responsive to current flows through said mechanism and commensurably to the integrated effects of such current flows therethrough, said movable element having a normal position and a plurality of relatively progressively advanced positions to any of which it may be moved and maintained upon the substantial continuance of current flows of predetermined integrated values through said mechanism to energize it, and means including electrical circuit conductors and said contact set to effect communication of electrical current to said mechanism in amounts commensurable to the amounts of current supplied co-incidentally therewith under the control of said contact set to said electro-thermal device.

52. In an electrical control system, electrical current source means, a slowly responsive electrically operable movable means, a current flow controller controlling the flow of current from said source means to said movable means, said controller operable by said movable means, and means variably responsive to the quantitative values of a controlling physical condition variably biasing said contact set against operation by said movable means, whereby varying values of said condition will require correspondingly varying operative efforts by said movable means to offset the biasing effect of the condition upon the controller, said controller adapted, whenever the said biasing effect thereon exceeds the effect of the movable means thereon, to effect communication of the proper amount of electrical current from the source, means to said movable means to gradually operate the motor until it substantially offsets the biasing effect of said condition upon the controller, a remotely disposable electro-responsive mechanism including a movable element movable responsive to current flows through said mechanism and according to the effective value of such current flows therethrough, said movable element having a normal position and a plurality of relatively progressively advanced positions to each of which it may be selectively moved and maintained upon the substantial continuance of energizing current flows of corresponding predetermined time integrated values through said mechanism, and means including electrical circuit conductors and said controller to effect communication of electrical current to said mechanism in amounts depending upon the amounts of current supplied under the control of said controller to said movable means, all of said current flows being substantially relatively co-incidental.

53. In an electrical remote control system, a pair of relatively remotely disposed thermostats, a separate electrical heater for each thermostat, current source means supplying current to coincidentally energize said heaters, electrical current flow controlling means operable by one of the thermostats when sufficiently heated to effect a reduction of the current supplied to both thermostat heaters, and biasing means for said controller, affected by the quantitative value of a varying physical condition to which it is exposed, for predetermining the temperature required to be achieved by said controller actuating thermostat to effect the said reduction of the energizing current flows for both said heaters, and a movable element actuatable by the other thermostat to cause it to take any of a plurality of progressively advanced positions depending on the temperature achieved by its associated thermostat under the control of said controller.

54. An electrical remote control system, in combination with electrical current source means, controlling station apparatus, controlled station apparatus, and electrical circuit conductors interconnecting said source means and said controlling and controlled apparatuses, said controlling apparatus comprising current flow controlling means responsive to a physical condition to which it is continuously exposed to effect variations in current flow from the source means to said controlled station apparatus, and also comprising electrical means energizable under the control of said controlling means to substantially equalize and counterbalance the effect of said physical condition upon said flow controlling means, said controlling means exercising time related commensurable electrical effects upon said electrical means and said controlled apparatus, said controlled apparatus comprising a movable element having a datum position and a plurality of relatively progressively advanced operative positions to any of which it may be moved according to the said electrical effect communicated to the controlled apparatus, said electrical effect being commensurable to the energization of said electrical means required to counterbalance the effect of said condition on said controlling means, said controlling means modifying the quantitative values of current flows from the source means to said electrical means and said controlled apparatus, inversely commensurably to the voltage values of the said source means.

55. An electrical system comprising electrical current source means, relatively remotely disposed controlling and controlled apparatuses, the controlled apparatus comprising electrical energizing means and an element movable from a datum position responsive to the energization thereof to any of a plurality of relatively progressively advanced positions, means to communicate current of varying predetermined time integrated effective values from said source means to said energizing means under the control of said controlling apparatus, means responsive to a physical condition to which the controlling apparatus is exposed tending to continuously effect a flow of current from said source means to said energizing means of predetermined value, and electrical means associated with said controlling apparatus and energized from said current source means under the control of said apparatus to approximately balance the operative effect of said condition upon said apparatus, said apparatus being thereby reactively controlled by said electrical means to limit the current flow from said source means to said energizing means to an integrated effective value which is commensurable to the effect of said condition.

56. A remote control system comprising an actuator responsive according to the quantitative value of a condition to which it is exposed, an electrical circuit comprising electrical current source means, electrical circuit conductors, a current flow controller, and a pair of relatively remotely disposed electro-responsive mechanisms each disposed in said circuit so as to be traversed by substantially concurrent energizing flows of current supplied from said source over said conductors under the common control of said controller, said controller operable under the joint oppositely effective controlling effects of said actuator and one of said mechanisms, so as to limit the said supplied current flows to effective values according to the said quantitative value of said condition, the other of said mechanisms comprising an element movable, according to the effective value of the current flow supplied to the mechanism, to one of a plurality of advanced positions corresponding to the departure of the quantitative value of said condition from a datum value thereof.

57. A remote control system comprising a current source means, a current flow controller, an actuating element therefor, electro-responsive means approximately off-setting the operative effect of the actuating element upon the controller energizable by current flow from the source means under the limiting control of the controller, and a remotely disposed electro-responsive mechanical element variably movable to different relatively advanced operative positions under the effect of current from said source means under the control of said controller, the effective values of current flows through both said electro-responsive means being thereby caused to be relatively numerically relatable over corresponding periods.

58. In an electrical remote control system, electrical current source means, an electrical controlling electrode variably displaceable commensurably to an operative effect of a physical condition to which it is exposed, a second electrode cooperating with the first electrode and adapted in cooperation therewith to modulate a flow of current serially directed through both electrodes, electrical means energizable under the control of current from said source traversing said electrodes operative to effect relative movement of the electrodes in opposition to the operative effect of said condition thereon to approximately balance said effect thereon, relatively remotely disposed electro-responsive means, means to communicate current from the source means to the said electro-responsive means, and a movable element for the electro-responsive means, having a datum position and a plurality of relatively progressively advanced operative positions to any of which it may be moved according to the quantitative values of currents communicated to said electro-responsive means as aforesaid, said electrodes jointly controlling substantially coincidental flows of current to said electrical means and said electro-responsive means.

59. In an electrical system, the combination with electrical current source means, of a pair of co-relatively remotely disposed electrical heating elements, a set of relatively movable controlling contacts adapted for engagement, circuit conductors interconnecting said source means, elements, and contacts, contact operating means variably operable responsive to the heating effect of one of said elements to control the relative movement of said contacts to control the electrical circuit therebetween, said contacts adapted to control the flow of current through both of said heating elements, said contact operating means comprising means responsive to force effects of a varying physical condition for modifying the operative effect of said contacts upon the current flow through both of said heating elements.

60. The method of physically reproducing a varying primary physical effect exerted at a first point, as a secondary physical effect exerted at a second point in quantitative commensurable relation to the primary effect, consisting in transmitting from the first point to the second point a train of electrical current impulses, varying the length of said impulses according to the quantitative value of the primary effect and inversely according to the voltage of electrical current employed, and in converting the current impulses received at the second point into a physical effort exerted upon a resistant movable element, said effort quantitatively modulated commensurably to the time integrated effect of the received current impulses.

61. The method of variably modulating the position of a self retractive shiftable electro-responsive mechanism commensurably with a varying controlling physical effect consisting in effecting an undulatory current flow to the mechanism, the periodicity of said undulations being sufficiently great relative to the inertia of the mechanism as to substantially avoid retraction of the mechanism between undulations and varying the time lengths of the undulations inversely according to the maximum values of the undulations and also according to some measure of the concurrent value of the degree of physical effect.

62. The method of electrical control consisting in effecting the modulated movement of a remote self retracting electro-responsive element according to variations of a varying controlling physical effect by directing a series of energizing current impulses to the element, modulating the lengths of each impulse inversely according to its maximum values of current and also according to a measure of the value of said controlling physical effect, while directing sufficient of said impulses per unit of time to the element as to substantially maintain it in a modulated position comparative to the concurrent value of said physical effect.

63. In an electrical system, a current flow controller operable responsive to varying effects of a varying physical condition exerted thereon, an electrically heated thermostat, a source of electrical current, an electrical circuit comprising electrical circuit conductors for communicating the current from the source to said thermostat under the control of said controller, said thermostat nullifying the operative effects of said condition exerted on said controller whenever heated to a higher temperature than that commensurable to said effects, and an electro-responsive mechanism comprising a movable modulatable element disposed remotely to said controller in said circuit, said element having a normal and a plurality of relatively modulated advanced operative positions to any of which it may be moved according to the effective values of current flows directed through the mechanism, and which position commensurably corresponds to the degree of effect of said condition exerted on said controller.

64. In an electrical system, a current flow controller operable responsive to the varying effects of a varying physical condition to which it is exposed, electrical current source means, a pair of relatively remotely disposed electro-thermally operable thermostatic elements, an electrical circuit comprising electrical circuit conductors for concurrently communicating current from said source means to both of said elements under the control of said controller, one of said elements having a portion movable when the element is heated by current from the source means effective to nullify the said effects of said condition on said controller when heated to a temperature commensurable to a predetermined degree of effect of the condition upon the controller, and mechanism modulatingly operable according to the accrued temperature of the other said thermostatic element, and according to said effects.

65. An electrical system comprising a controlling electrically energizable thermostat, electrical current source means, a controlled electrically energizable thermostat disposed remotely to the first thermostat, electrical circuit conductors interlinking said source means with both said thermostats, a set of electrical contacts actuatable to effect simultaneous commensurable variation of electrical current flow from said source over said conductors through both said thermostats, means for communicating a physical effect to actuate said contact set and to bias it in an operated condition to a degree depending upon the degree of said effect, said controlling thermostat operable according to its temperature towards reversing the operated condition of said contacts and operative to completely nullify said operated condition whenever its temperature is more than commensurable to the amount of bias, and a movable means modulatingly operable to a degree commensurable to the accrued temperature of said controlled thermostat, and consequently commensurable to the concurrent degree of physical effect.

66. In a remote control system, electrical current source means, a pair of relatively remotely disposed electro-responsive means, an electrical current flow controller effecting a common concurrently modulated control of current flow to each of said electro-responsive means from said source means, said controller exposed to a varying operative effect of a varying controlling physical condition and commensurably operable responsive thereto to modulate the current flow from said source means to a controlled one of said electro-responsive means, the other of said electro-responsive means exerting a reactionary effect on said controller opposite in kind to that exerted thereon by said force effect, and movable means modulatively responsive to modulations of the degree of energization of the said controlled electro-responsive means to effect a mechanical result concurrently quantitatively commensurable to the operative effect of said varying physical condition.

67. The system substantially as set forth in claim 66 characterized by the provision of means comprising an electrical relay operable upon a predetermined departure from equality between said operative effect and said reactionary effect upon the controller, said relay controlling the flow of current through said first mentioned electro-responsive means.

68. The system substantially as set forth in claim 66 characterized by the provision of means comprising an electrical relay operable upon a predetermined departure from equality between said operative effect and said reactionary effect, said relay controlling the flow of current through said controlled electro-responsive means.

69. The system substantially as set forth in claim 66 characterized by the provision of means to interrupt the flow of current after said movable means has reached an operative position.

70. The system substantially as set forth in claim 66 characterized by the provision of manually operable means comprising switch contacts adapted to close a circuit to initiate a current flow through said reactionary electro-responsive means to energize it, and an electrical relay comprising contacts automatically substituted upon energization of the relay for said switch contacts to maintain the flow of current initiated by the switch contacts, said relay energizable responsive to closure of said switch contacts, and said relay adapted to be automatically de-energized by the electro-responsive reactive effect of said first mentioned electro-responsive means when the said operative effect of the condition upon the controller is substantially offset by the reactionary effect of said controlled means thereon.

71. The system substantially as set forth in claim 66 characterized by the provision of an indicating scale for said movable means, a starting switch interposed in said circuit conductors for initiating the communication of current from said source means to both of said electro-responsive means, and means automatically operable after a complete indicating operation effected by said movable means to de-energize both of said electro-responsive means.

72. The system substantially as set forth in claim 66 characterized by the provision of an indicating scale for said movable means, a starting switch interposed in said circuit conductors for initiating the communication of current from said source means to both of said electro-responsive means, and means automatically operable after a complete indicating operation effected by said movable means to de-energize both of said electro-responsive means, and means for maintaining said movable means in its fully operated indicating position after de-energization of its associated means.

73. In combination with electrical current source means, an electrical current flow controller, a first electro-responsive means, and a second electro-responsive means disposed remotely thereto, circuit conductors so joining the controller and both of said electro-responsive means to said source means, as to conduct current flows from said source means concurrently through each of said electro-responsive means to concurrently separately energize them under the common control of said controller, indicating means associated with the second electro-responsive means movable responsive to changes of the energization of said second electro-responsive means to measurably indicate its energization, said controller operable by the effect of pressure exerted thereon to effect a substantial change in the amount of current flow from said source means to both said electro-responsive means, said first electro-responsive means so disposed as to effect a reactionary control upon said controller tending to nullify the operative effect of the pressure exerted thereon, said pressure being operative to bias said controller against the reactionary effect of said first electro-responsive means to a degree depending upon the value of the pressure effect exerted on the controller, and means to adjustably vary the effect of said first electro-responsive means, relative to the effect of the pressure exerted thereon.

74. In an electrical telemetric control system, an electrical controller comprising a current flow commutator and reactive operating means therefor, said commutator controlling said reactive means, electrical current source means, a remotely disposed electro-responsive means, an electrical circuit comprising electrical circuit conductors, said reactive means, said source means, said electro-responsive means and said commutator for concurrently communicating commensurable current flows from said source means to both said reactive means and said electro-responsive means under the common control of said commutator, the energization of said reactive means and said electro-responsive means being periodically increased by operation of said commutator by current from said source means whenever the energization of the reactive means is insufficient to effect a predetermined flow controlling operative condition of said commutator, control means associated with said controller responsive to changes in an operative effect of a varying controlling physical condition to which it is exposed to modify the integrated values of the current flows directed through said electro-responsive means, said electro-responsive means comprising a movably modulatable element having a datum position and a plurality of relatively modulated advanced operative positions to any of which it may be selectively moved and maintained according to the effective integrated values of current flow directed through said electro-responsive means, and which position relative to said datum position is enantiomorphous to the degree of operative effect of said physical condition exerted on said controller, all electro-responsive elements of said system being only unidirectionally operable responsive to current flows therethrough.

75. The method of variably modulating the position of a remote self retractive shiftable electro-responsive mechanism commensurably with a varying controlling physical effect consisting in effecting an undulatory current flow to the mechanism, the periodicity of its undulations being sufficiently great relative to the inertia of the mechanism as to substantially avoid retraction of the mechanism between undulations and varying the time lengths of the undulations according to the maximum values of the undulations and concurrently controlling the time integrated value of the current flowing to said mechanism according to some measure of the concurrent value of the degree of physical effect.

76. The method of variably modulating the position of a self retractive shiftable electro-responsive mechanism commensurably with a varying controlling physical effect consisting in effecting an undulatory current flow to the mechanism, varying the time lengths of the undulations according to the maximum values of the undulations and concurrently varying the time integrated effect of the current flowing to said mechanism commensurably to the concurrent value of the degree of physical effect wherein the effective time lengths of said undulations relative to intervening periods is caused to be sufficiently great relative to the inertia of the mechanism as to substantially maintain the mechanism modulatingly shifted responsive to said current flow, to an advanced position corresponding to the effective integrated value of said flow.

77. The method of electrical control, consisting in effecting the modulated movement of a remote self retracting electro-responsive element according to variations of a varying controlling physical effect, by directing a series of energizing current impulses to the element which are modulated in lengths inversely according to the instantaneous values of current strength, while concurrently controlling the time integrated value of the current flowing to said mechanism according to some measure of the concurrent value of the degree of said physical effect, to communicate an operative unidirectional effort commensurable to said physical effect to the element to advance it, the periodicity of said impulses being sufficiently great relative to the inertia of the mechanism as to substantially avoid retraction of the mechanism between impulses, and varying the time lengths of the impulses according to the maximum values of the impulses and also according to some measure of the concurrent value of the degree of physical effect.

78. The method of electrical control consisting in effecting the modulated movement of a remote self retracting electro-responsive element according to variations of a varying controlling physical effect, by directing a series of energizing current impulses to the element which are modulated in lengths inversely according to the instantaneous values of current strength and also according to a measure of the value of said physical effect, to communicate an operative unidirectional effort commensurable to said physical effect to the element to advance it, varying the time lengths of the impulses according to the maximum values of the impulses, and also modulating the effective value of the current flow consisting of said impulses according to some measure of the concurrent value of the degree of physical effect, whereby the duration of said impulses relative to intervening periods is sufficient that the inertia properties of the mechanism maintains the mechanism in an advanced position, corresponding to the concurrent value of said physical effect.

79. The method of modulating the position of a shiftable element disposed at a controlled station proportionally to a varying force exerted at a control station which consists in communicating concurrent electrical current flows through both stations, breaking up said current flows into substantially like impulses variable in length in inverse proportion to the voltage, applying said force to vary the quantitative integrated effective values of the current flows commensurably to said force, and applying the current flow at the controlled station, to an electro-responsive movable modulatable element of such inertia and retractive properties whereby said element will take the modulated position enantiomorphously related to the force exerted at the control station.

80. The method of modulating at a remote controlled station the position of a self retracting movable element enantiomorphously commensurable to a varying primary physical force at a control station, which consists in effecting concurrent current flows through both stations, causing at least a part of the current at the control station to progressively build up a secondary physical force until it bears a predetermined relation to the primary force, concurrently and commensurably modulating the current flows at both stations in response to deviations from said relation, and effecting at the controlled station a solely unidirectional physical effort to cause a solely one-way modulative movement of said movable element proportional to the current at the latter station, to positively position said element to such an advanced position peculiarly representing the force of said primary effect.

81. An electrical method of electrically positively positioning a movable element at a remote point according to a varying physical effect exerted at another point comprising modulating the lengths of each of a series of substantially like electrical current impulses in proportion inversely to the voltage of the electric current employed, and concurrently varying the effective time integrated values of a number of successive of said impulses commensurably to the force exerted by said effect.

82. An electrical method of producing at a first point a modulated physical movement of a movable element which is proportional to a varying physical effect at a relatively remote second point, comprising varying at the second point the lengths of a series of electrical current impulses transmitted from the second to the first point in proportion inversely to the strengths of individual electric impulses of the series, and in varying the integrated quantitative values of successive of said impulses in proportion to said varying physical effect.

83. In an electrical system for producing at a relatively remote controlled station a physical effect proportional to a varying physical condition at a control station, a pair of electrically energizable elements, electrical current source means electrically energizing both of said elements, a control apparatus at the control station responsive to energization of a first of said elements disposed thereat, operative to substantially break the flow of current supplied from said source means to the stations, into impulses of lengths inversely proportional to the voltage of said source means, a member at the control station responsive to effects of said varying condition at the control station for further modulating the quantitative time integrated value of the current supplied to the other element disposed at the controlled station, and modulatable movable means at the controlled station modulatively responsive to energization of the said other element by said impulses to cause a modulative movement thereof proportional to the time integrated value of the energizing effect of current traversing the latter element.

84. An electrical system for modulating a modulatively movable element at a controlled station proportionally to a varying physical effect at a control station comprising an electro-thermally responsive controlling element responsive to said varying condition to control its temperature to maintain its temperature proportional to said physical effect, an electro-responsive modulatively movable element at the controlled station, and electrical means responsive to variations of resulting temperature of said controlling element for energizing said electro-responsive movable element to a degree commensurable to the resulting temperature of said controlling element, to effect a modulated positioning of said movable element.

85. In an electrical system for positioning a movable means disposed at a controlled station, according to changes in a varying condition effected at a control station, a pair of electrically energizable elements, electrical curent source means electrically energizing both of said elements, one of said elements being adapted to quantitatively modulate current concurrently passing from the source means through both of the elements, a member at the control station responsive to said varying condition for proportionately quantitatively modulating all of said current passing through one of the elements which is disposed at the control station, the other element located at the controlled station and including a self retractive movable means modulatively movable responsive to varying energization of the element, the movement of said movable means being at all times enantiomorphously related quantitatively to the time integrated operative effects of the energizing current flow through the controlled element, all of the control of the controlled movable means from the controlling station being effected solely by quantitative variations of current flow.

86. The method of remote control, comprising building up by continued application of heat a force generating temperature until a resulting temperature generated force substantially balances a force effect resulting from and quantitatively related to a controlling physical condition, and by concurrently with said application of heat, applying heat for a corresponding period to a remotely disposed thermally responsive movable means to effect a measured controlled movement of said means to move it against a counter force to an advanced position corresponding to the accrued effective temperature of said movable means.

87. The method of remote control comprising balancing an operative effect of a controlling varying physical effort, by a thermally effected force variably effective upon departures from a predetermined relation between the said effort and the said force to achieve an approximate balance between said force and said effort, in maintaining the balanced condition, by intermittently increasing the thermal effect required to offset cooling and to compensate for changes in degree of said effort and concurrently supplying separate, correspondingly varying, heating impulses, to a remotely disposed self-restorable heat-responsive controlled movable element commensurable in heating value and duration to the said thermal effects, to modulatively position said element, in an advanced position related to the degree of said effort, against its inherent tendency toward restoration.

88. In an electrical system for remote control, an electrical switch operable by a force effect communicated thereto, a heat operated restoring means for said switch, a heat operated mechanism adapted to operate to a degree commensurable to a temperature communicated thereto disposed remotely to said switch, a source of current, and electrical circuit conductors interconnecting said mechanism, restoring means, source, and switch, said switch under the joint alternately predominating control of said force effect and said restoring means, being automatically operated periodically to periodically concurrently electrically energize said mechanism and restoring means, with sufficient continuity as to maintain said mechanism in an advanced modulated operated condition which relative to a datum condition of operation is commensurable to said force effect.

89. In an electrical system, a movable means, a source of current, a current flow controller operable under the control of the movable means, an electro-responsive means adapted when energized to accumulatively effect an opposite kind of control upon the controller, an electro-responsive mechanism adapted for disposition remotely to the movable means, both said electro-responsive means and mechanism adapted for gradual decay of functional effect during periods of substantially lowered current flows therethrough, said controller correspondingly and concurrently controlling the flows of current through both said electro-responsive means and said mechanism, said mechanism comprising a movable element, said mechanism receiving current from said source under the control of said controller to effect movement of said movable element from a datum position to any one of a plurality of progressively advanced positions according to the quantitative value of the current through said mechanism.

90. In a remote control mechanism, an electrical flow controller operable responsive to effects of a varying physical condition exerted thereon to change its current flow controlling condition, electrically operable means to restore the original current flow controlling condition of the controller, a remotely disposed electro-responsive modulatingly operable mechanism, and electrical source means effective by operation of said controller to concurrently effect electrical energization of the electrically operable means and the electro-responsive mechanism whenever the restoring effect of the electrically operable means on said controller is less effective than the said effects of said physical condition, exerted thereon, said mechanism operated modulatably according to the time integrated effects of current flows therethrough.

91. In an electrical system, in combination with an electrical current source means, a movable means, an electrical current flow controller directly operable, and biased against restoration, by said movable means when moved, an electro-responsive means adapted under the control of said controller, to variably oppose the effect of the movable means on the controller, an electro-responsive mechanism variably responsive commensurably with the degree of its energization adapted for disposition remotely to the movable means, and electrical circuit conductors interconnecting the controller, said source means, said electro-responsive means, and said indicator, to conduct commensurable flows of current from the source means through said electro-responsive means and said mechanism to separately and commensurably energize them under the direct common control of said controller, said mechanism comprising a self-retractible movable element movable through a range of variably advanced positions and maintainable at any of said positions according to the quantitative effect of the current flow through the mechanism.

92. In an electrical system, a controller, a movable means for operating the controller, a heat operable means for opposing the effect of the movable means upon said controller, a heat operable indicator disposed remotely to said controller, a movable element therefor, electrical current source means, separate electrical heating elements for separately heating said mechanism and the heat operable means, said movable element movable to and adapted to be maintained in any of a plurality of relatively advanced positions according to the thermal effects of the associated heating elements upon said indicator, and electrical circuit conductors interconnecting said controller, and said elements, and said current source means, said controller, under the joint control of said movable means and said heat operable means, adapted for variable operation to variably effect flows of current from the source means to energize said elements.

93. In an electrical system for remotely indicating the value of a variable pressure, a controlling and a controlled electrical heating element, an electrical current flow controller, a source of current, and electrical circuit conductors interconnecting said source, said heating element and said controller, said controller when operated adapted to effect a flow of current from said source over said conductors through said elements to concurrently heat them, and means variably responsive to the pressure to be indicated, adapted to operate said controller and to bias it against restoration an amount depending upon the value of the pressure to be indicated, and thermally operable means disposed so as to respond to heating, adapted to gradually restore said controller, and a thermally responsive indicator adapted to indicate the accrued temperature of said controlled element, and separate temperature compensating means for each of said thermally operable means and said indicator, adapted to compensate the same for variations in ambient temperatures.

94. A remote control system comprising a current flow controller acted upon by a controlling physical force, an electro-responsive element, an electro-responsive mechanism disposed remotely to said element, said electro-responsive element adapted when energized to respond until its degree of response bears a predetermined relation to the degree of said force, and disposed so as to then nullify the operative effect of said controller caused by said force, a source of electrical current, and circuit conductors adapted under the control of said controller to conduct simultaneous quantitatively relatable flows of current from the source to both said electro-responsive element and said mechanism to proportionally energize them, said controller being operative to commutate the current flow to the mechanism to effect a train of current impulses whose aggregate length in a given longer period is quantitatively related to the degree of said force acting upon the controller, and inversely quantitatively related to the strength of current of each impulse.

95. An electrical remote control system comprising a pair of separate relatively remote electro-thermally responsive means, electrical current source means and means to effect communication of current from said source means concurrently to both of said responsive means, one of said responsive means modulating the current flow to both of said responsive means and current flow modulating means effective commensurably to a varying force resulting from a varying controlling physical condition for further modulating the current flow to at least the controlled responsive means, both of said electro-thermally responsive means having thermally energizable parts proportioned for heating and cooling at commensurable rates.

96. In combination with a container for liquid, electrical current source means, an electrical current flow controller, pressure means associated with the container adapted to respond to changes of level in the container to adjustably operate the controller to correspond with the existing level, a thermostat adapted under varying degrees of heating to variably off-set the effect of the pressure means on the controller, a heating element for electrically heating the thermostat, an ambient air temperature compensating thermo-current indicator, said indicator comprising a movable indicator element, means comprising circuit conductors so joining the controller, said element, and said indicator, to the source means as to simultaneously conduct current from the source means through each said element and indicator to concurrently energize them under the control of said controller whenever the effect of the pressure means upon the controller is greater than the off-setting effect of said thermostat, and to successively re-energize them whenever by slight loss of temperature said thermostat has lost a slight part of its effect upon the controller.

97. In an electrical remote control system, electrical current source means, an electrical current flow controller, control means adapted to bias the controller to an operative condition wherein it exercises a certain current flow control according to the particular position of said control means, a thermostat adapted under varying temperatures to variably off-set the effect of the control means on the controller, a heating element for electrically heating the thermostat, an ambient air temperature compensating thermo-current indicator, means comprising circuit conductors so joining the controller, said element and said indicator to the source means as to simultaneously conduct current from the source through each said element and said indicator, under the common control of said controller, to correspondingly energize the thermostat and indicator, and means adapted to compensate the said thermostat in its effect on the controller, for changes in atmospheric temperatures.

98. In an electrical remote control system, electrical current source means, a set of electrical contacts, movable means adjustably movable to operate the contacts, an accumulatively operable electro-responsive means adapted, when energized by substantial current flows therethrough, to ultimately exercise an operative effect on the contacts opposite in kind to the effect of the movable means thereon, a remotely disposed accumulatively operable electro-responsive mechanism, said mechanism comprising an element modulably moved according to the degree of energization thereof, means comprising circuit conductors so joining the contacts, said electro-responsive means, and said indicator to the source as to simultaneously conduct flows of current from the source under the control of said contacts through both said electro-responsive means and said mechanism to separately and co-incidentally energize them, effect modulated movements of the said mechanism element according to the quantitative value of the effect of the electro-responsive means on said contacts.

99. In an electrical system, a movable means, a source of current, a current controller operable under the control of the movable means, an electro-responsive means adapted when energized to accumulatively oppose the effect of the movable means on the controller, an electro-responsive mechanism adapted for disposition remotely to the movable means, both said electro-responsive means and mechanism adapted for gradual decay of functional effect during periods of substantially lowered current flows therethrough, said controller controlling the flows of current through both said electro-responsive means and said mechanism, said mechanism comprising a movable element, said mechanism receiving current from said source under the control of said controller to effect movement of said movable element from a datum position to any one of a plurality of progressively advanced positions according to the integrated quantitative value of the effects of current through said mechanism.

100. In an electrical system, a current flow controller, electrical current source means, a remote self-retractive shiftable electro-responsive mechanism movable under the control of said controller, said controller comprising control means responsive and commensurable to a varying controlling physical effect to effect a flow of current to the mechanism to shift it, means to communicate at least a part of the controlled current flow to the controller to reactively energize it to cause it to modify the current controlling effects thereof, said controller thereby under the opposite influences of the said physical and reactive effects modulating the current flow to effect its flow in successive undulations of current, said mechanism having sufficient properties of inertia to substantially resist retraction between undulations to a degree limited by the proportion of time said undulations are effective on the mechanism.

101. The electrical system substantially as set forth in claim 100 characterized by the provision of electro-thermal means for energizing the mechanism having heat storage properties to supply at least a part of the said inertia properties to the mechanism.

102. The electrical system substantially as set forth in claim 100 wherein the control means for said controller and the means for communicating the reactive flows of current to the controller are separate means.

103. The electrical system substantially as set forth in claim 100 characterized by said controller operable to successively make and break the current flow to said mechanism.

104. The electrical system substantially as set forth in claim 100, wherein said controller interrupts the current flow to said mechanism, at frequent intervals, said controller modulating the length of the intervals to values commensurable to the voltage of the said current source means.

105. The electrical system substantially as set forth in claim 100 wherein said reactive means are electro-thermally energizable.

106. The electrical system substantially as set forth in claim 100, characterized by said controller being biased by the operation of said physical effect against the effects of said reactive means to predetermine the degree of reactive effect.

107. In an electrical system, a controller, a remote self-retractive shiftable electro-responsive mechanism movable under the control of said controller, said controller responsive and commensurable to a varying controlling physical effect to effect a modulated controlled undulatory flow of current to the mechanism to modulatingly shift it, and means to communicate at least a part of the controlled current flow to the controller to reactively modify the current controlling effects thereof to decrease the effects of the current flow to the mechanism according to increases in the intensity of the controlled current flow.

108. The electrical system substantially as set forth in claim 107 characterized by said mechanism, being electro-thermally energizable to varying degrees according to the controlling effects of said controller.

109. The electrical system as substantially set forth in claim 107 wherein said controller and the means for communicating the reactive flows of current to the controller are separate means.

110. The electrical system as substantially set forth in claim 107 characterized by said controller operable to periodically interrupt the current flow to said mechanism.

111. The electrical system as substantially set forth in claim 107, wherein said controller interrupts the current flow to said mechanism at frequent intervals, the length of which is commensurable to the voltage of electrical current employed.

112. The electrical system substantially as set forth in claim 107 wherein said reactive means are electro-thermally energizable.

113. The electrical system substantially as set forth in claim 107 characterized by said controller, being biased by the operation of said physical effect against the effects of said reactive means, and thereby predetermining the degree of reactive effects thereof.

114. The method of remote control comprising opposing an effect of a controlling varying physical effort, by a thermally effected force variably effective upon departures from a predetermined relation between the said effort and the said force to achieve an approximate balance in force and effort, in maintaining the balanced condition, by intermittently increasing the thermal effect required to do so, and concurrently supplying separate, correspondingly varying impulses of current to a remotely disposed electro-responsive controlled element commensurable in heating value and duration to the said thermal effects.

115. The method of remote control comprising opposing an effect of a controlling varying physical effort, by a reactively effected force variably effective upon departures from a predetermined relation between the said effort and the said force to achieve an approximate balance in force and effort, in maintaining the balanced condition, by intermittently increasing the reactive effect required to do so, and concurrently supplying a single train of separate, correspondingly varying, impulses of current to a remotely disposed electro-responsive controlled element commensurable in effective value and duration to the said reactive effects.

116. In a system for indicating the amount of liquid in a tank at a level different from the liquid level, a movable member variably responsive to weight of liquid communicated thereto from the tank according to the amount of liquid therein, an electrical heating element, a source of electrical current, means responsive to the movement of said member to close an electrical circuit comprising said source of current and said element to heat the element, means responsive to heating of said element to exert a moving effort on said movable member in opposition to the weight of liquid thereon with a force commensurable to its accrued temperature to restore said member and reopen the electrical circuit when the said force exerted on the member by the weight of liquid is slightly overcome by the force exerted by said opposing means, and remotely disposed movable means operable to indicate the relative lengths of the periods during which said circuit is closed and opened, respectively.

117. In an automotive tank fuel gauge, a thermo-responsive indicator, an electrical heating element therefor, said indicator indicating the accrued temperature of said element, a source of electrical current, a set of electrical contacts, a second electrical heating element, circuit conductors so interconnecting said second element, said first element and said contacts to said source, to communicate current from the source to both said elements whenever the contacts of said set are closed, a movable member exposed to weight of liquid of the tank and responsive thereto to close said contacts, and means responsive to heating of said second element opposing the effect of the weight of liquid on said member, to reopen said contacts, both said elements being heated when and only when said contacts are closed.

118. In an electrical indicating system, a control means a portion variably movable responsive to varying physical effects whose quantitive values are to be indicated, electrical current source means, an electrical circuit comprising electrical circuit conductors, a current flow controller responsive to the movement of said control means to modulate the effective integrated value of current flowing in the said circuit, an electrically energizing in the said circuit, an electrically energizable thermostat in said circuit having a portion modulatively movable responsive to changes in its temperature tending to nullify the operative effect of said control means on said controller, and a separate electro-responsive movable element in the said circuit, modulatable under the control of said controller to effect indication of the temperature of the thermostat.

119. In a system for measurably indicating varying pressures, an electric current controller, said controller operable by said varying pressures, an electric thermally responsive movable element, a source of electric current, and means comprising electrical circuit conductors for communicating current from the source through the controller to said element to heat it to cause it to achieve accrued temperatures commensurable to the pressures, said element responsive to its accrued temperatures to nullify the effects of the pressures upon said controller, and relatively remotely disposed means operable under the control of the controller adapted to concurrently modulatably indicate the varying temperatures of said element.

120. An electrical system comprising a thermostat, an electrical heating element therefor, electrical current source means, a second electrical heating element disposed remotely to the said element, electrical circuit conductors interlinking said source means with both said elements, a set of electrical contacts actuatable to effect simultaneous modulation of electrical current flows from said source over said conductors through both said heating elements, means for communicating a force effect of a varying physical controlling condition to actuate said contact set in one way, said thermostat disposed to be modulatively operated by modulated current flow through its associated heating element to a degree determined by the degree of said communicated force effect actuating said contacts and according to its temperature, to operate said contacts in an opposite way, and a movable element responsive to the temperature of said second element, movable modulatively commensurable to said force effect.

121. The method of physically reproducing a varying primary physical effect exerted at a first point, as a secondary physical effect exerted at a second point in quantitative commensurable relation to the primary effect, consisting in transmitting from the first point to the second point a train of electrical current impulses, varying the length of said impulses inversely according to the voltage of electrical current employed, further modulating the effective value of the impulses according to the degree of primary effect and in converting the current impulses received at the second point into a physical effort exerted upon a resistant movable element, said effort quantitatively modulated commensurably to the time integrated effects of the received current impulses.

122. An electrical remote control system comprising a pair of separate relatively remote electro-thermally responsive means, electrical current source means and means to effect communication of current from said source means concurrently to both of said responsive means, one of said responsive means modulating the current flow to both of said responsive means and current flow modulating means effective commensurably to a varying force resulting from a varying controlling physical condition for further modulating the current flow to both of said means, both of said electro-thermally responsive means having thermally energizable parts proportioned for heating and cooling at commensurable rates.

123. An electrical remote control system comprising a pair of separate relatively remote electro-thermally responsive means, electrical current source means, and means to effect communication of current from said source means concurrently to both of said responsive means, one of said responsive means modulating the current flow to both of said responsive means and current flow modulating means effective commensurably to a varying force resulting from a varying controlling physical condition for further modulating the current flow to at least the controlled responsive means both of said electro-thermally responsive means having thermally energizable parts proportioned substantially alike so as to accumulate and loose temperature effects at substantially the same rates.

124. An electrical remote control system comprising a pair of separate relatively remote electro-thermally responsive means, electrical current source means and means to effect communication of current from said source means concurrently to both of said responsive means, one of said responsive means modulating the current flow to both of said responsive means and current flow modulating means effective commensurably to a varying force resulting from a varying controlling physical condition for further modulating the current flow to both of said responsive means, both of said electro-thermally responsive means having thermally energizable parts proportioned substantially alike so as to accumulate and loose temperature effects at substantially the same rates.

125. In an electrical remote control system electrical current source means, a set of electrical current flow controlling contacts, biased by a force effect of a varying physical condition to a circuit closing condition the amount of said bias varying according to the degree of said condition, a thermostat adapted when heated to a temperature commensurable to the existing force effect to operate said contacts to reopen the circuit, electrical means for heating the thermostat, relatively remotely disposed electro-responsive means and electrical current source means operatively included in the electrical circuit together with said contacts, said contacts when operated effecting commensurable changes in the effective values of current flows from said source means through both said electrical means and said electro-responsive means, and a modulatably movable element associated with said electro-responsive means and responsive to the time integrated and modulatively responsive to the modulated time integrated effects of a train of electrical impulses therethrough through the electro-responsive means, said contacts alternately opened and closed by the alternately predominating effects of said bias imposed upon them and said thermostat, the said electrical means being energized by current flow from said source means whenever the effect of said bias predominates over the effect of said thermostat, to heat the thermostat to overcome the bias and reopen the contacts.

126. The remote control system substantially as set forth in claim 125 characterized by said electrical means being so thermally disposed relative to said thermostat and of such sufficient mass and consequently having such heat storage properties that when said contacts are suddenly opened to interrupt the current flow through said electrical means, said electrical means will continue to supply heat to said thermostat for a slight interval of time sufficient to cause said thermostat to continue to effect movement of an element of said contacts to increase the separation therebetween, whereby a positive non-arcing circuit opening relative movement of the contacts of the set is effected by said thermostat.

127. In an electrical remote control system electrical current source means, a set of electrical current flow controlling contacts, biased to a circuit closing condition, a thermostat adapted when heated to a temperature commensurable to the existing force effect to operate said contacts to reopen the circuit, electrical means for heating the thermostat, relatively remotely disposed electro-responsive means and electrical current source means operatively included in the electrical circuit together with said contacts, said contacts when operated effecting commensurable changes in the effective values of current flows from said source means through both said electrical means and said electro-responsive means variably operable by a force effect of a varying physical condition to quantitatively modulate the current flow from said source means through said electro-responsive means according to the variations in degree of said force effect, and a modulatably movable element associated with said electro-responsive means and responsive to the time integrated and modulatively responsive to the modulated time integrated effects of a train of electrical impulses therethrough through the electro-responsive means, said contacts alternately opened and closed by the alternately predominating effects of said bias imposed upon them and said thermostat, the said electrical means being energized by current flow from said source means whenever the effect of said bias predominates over the effect of said thermostat, to heat the thermostat to overcome the bias and reopen the contacts.

128. The remote control system substantially as set forth in claim 127 characterized by said electrical means being so thermally disposed relative to said thermostat and of such sufficient mass and consequently having such heat storage properties that when said contacts are suddenly opened to interrupt the current flow through said electrical means, said electrical means will continue to supply heat to said thermostat for a slight interval of time sufficient to cause said thermostat to continue to effect movement of an element of said contacts to increase the separation therebetween, whereby a positive non-arcing circuit opening relative movement of the contacts of the set is effected by said thermostat.

129. The method of indicating the level of liquid in a motor vehicle liquid fuel supply tank in which the liquid fuel may periodically surge responsive to movements of the vehicle, which includes causing an electric current to vary responsive to changes of liquid level in the tank and to change the temperature of a thermally responsive element controlling the indications of an indicating instrument at a rate substantially lower than the minimum periodicity of the liquid surges.

130. In a system and apparatus for indicating the level of liquid in a motor vehicle liquid fuel supply tank in which the liquid may periodically surge responsive to movements of the vehicle, an indicating instrument having a thermally responsive actuating element, a source of electric current and an electric circuit for energizing the actuating element, a current controller in the circuit associated with the tank and responsive to change of the liquid level therein to correspondingly vary the current, and the thermally responsive actuating element having a predetermined thermal inertia whereby a change of temperature thereof sufficient to effect a change of instrument indication will occur at a substantially lower rate than the minimum liquid surge periodicity whereby said surges may effect substantially no change of indication on the instrument.

131. In a system and apparatus for indicating the level of liquid in a motor vehicle liquid fuel supply tank in which the liquid may periodically surge responsive to movements of the vehicle, an indicating instrument, a source of electric current and an electric circuit for energizing the instrument, a current controller in the circuit associated with the tank and responsive to changes of the liquid level therein to correspondingly vary the current, an element in the circuit thermally responsive to changes of current and controlling indications of the instrument and having a predetermined thermal inertia whereby change of temperature thereof sufficient to effect a change of instrument indication will occur at substantially a lower rate than the minimum liquid surge periodicity whereby said surges may effect substantially no change of indication on the instrument.

In testimony whereof I hereunto affix my signature this 30th day of September, 1924.

FRANK M. SLOUGH.